United States Patent [19]

Williams et al.

[11] 3,912,803

[45] Oct. 14, 1975

[54] PURIFICATION OF PHOSPHORIC ACID

[75] Inventors: Thomas Alan Williams, Beckermet; Frank Michael Cussons, Little Broughton, both of England

[73] Assignee: Albright & Wilson Limited, Warley, England

[22] Filed: Apr. 23, 1973

[21] Appl. No.: 353,850

[30] Foreign Application Priority Data
Oct. 2, 1972  United Kingdom............... 45380/72

[52] U.S. Cl. ..................... 423/321; 23/297; 23/299
[51] Int. Cl.² .................. B01D 9/02; B01D 11/04; C01B 25/22
[58] Field of Search...... 23/293 R, 312 P, 299, 297, 23/300, 301 R, 295, 296; 423/321 S

[56] References Cited
UNITED STATES PATENTS

| | | | |
|---|---|---|---|
| 1,451,786 | 4/1923 | Ross | 423/321 S |
| 1,929,442 | 10/1933 | Milligen | 423/321 S |
| 1,968,544 | 7/1934 | Vana | 423/321 S |
| 3,298,782 | 1/1967 | Archambault | 423/321 S |
| 3,338,674 | 8/1967 | Baniel | 423/321 S |
| 3,707,357 | 12/1972 | Chiang | 423/321 S |

FOREIGN PATENTS OR APPLICATIONS

| | | | |
|---|---|---|---|
| 1,240,285 | 7/1971 | United Kingdom | 423/321 S |
| 1,050,961 | 12/1966 | United Kingdom | 423/321 S |
| 1,220,020 | 5/1960 | France | 423/321 S |
| 1,142,719 | 2/1969 | United Kingdom | 423/321 S |

*Primary Examiner*—Jack Sofer
*Assistant Examiner*—S. J. Emery
*Attorney, Agent, or Firm*—Flynn & Frishauf

[57] ABSTRACT

Solvent extracted phosphoric acid obtained by the wet process, e.g. using a cyclic pentanone or hexanone, as the solvent extractant may be further purified by raising the concentration to a $P_2O_5$ value of at least 61% and subsequently cooling to produce crystals of $H_3PO_4 \cdot \frac{1}{2}H_2O$. The crystals are separated from the mother liquor and either melted or dissolved in water to produce phosphoric acid of high purity.

26 Claims, No Drawings

PURIFICATION OF PHOSPHORIC ACID

The present invention relates to a process for increasing the purity of wet process phosphoric acid.

Phosphoric acid is manufactured in two ways: the thermal process and the wet process. In the thermal process elemental phosphorus is oxidised and the resulting $P_2O_5$ is dissolved in water. The "thermal acid" obtained has a high degree of purity which enables it to be used among other things in the manufacture of food and beverages — the so-called food grade acid.

Wet process phosphoric acid (hereinafter called WPA) on the other hand contains a considerable variety of impurities many in significant amounts, and it is in general suitable only for the manufacture of fertilizers. Various attempts have been made since the 1920's to purify WPA and these have been successful in varying degrees, but it has not hitherto been possible to make a product which could be considered for use as food grade acid. Four types of purification process have in fact been tried or used. Two of these: distillation of the WPA and the use of ion exchange resins have been too costly to use commercially. The third, or chemical, method involves the use of a succession of chemical processes such as precipitation of metal hydroxides and calcination of organic impurities. This type of method, although involving a number of skilled operations, is satisfactory for the production of acid which is sufficiently pure for making detergent phosphates, but is far from pure enough for use in food manufacture. The fourth method of purifying WPA, is one which has been proposed for over 40 year and attempts to commercialise which have been made with varying degrees of success over that period namely that of solvent extraction. Some of such solvent extraction processes product acid which is suitable for many purposes, including the manufacture of detergents, but which still contains significant quantities of metal impurities, of the order of 500 ppm on a 60% $P_2O_5$ basis, comprising such metals as Na, Fe, Ca and Cu, together with non-metallic impurities, for example up to 100 ppm fluorine and often significant amounts of sulphate, 1% or more, that render it unacceptable for use as food grade acid.

More recent processes are capable of producing an acid having an impurity content of about 100 ppm or less.

There has been a proposal in Japanese Patent Specification No. 44-14692 published in 1969 to up-grade WPA which has previously been desulphated and defluorinated by chemical means, by crystallisation. This proposal is not in fact practicable as a method of producing phosphoric acid crystals. Although it is known that by cooling aqueous acid of concentration below 67% $P_2O_5$ it crystallises as $H_3PO_4$ ½$H_2O$ (see Thorpe's Dictionary of Chemistry, Fourth Edition, Volume IX p.503) this knowledge relates to thermal acid and hence is only of academic interest, thermal acid requiring no purification. If one attempts, as proposed in the said Japanese Specification, to crystallise chemically purified WPA, the various metal impurities, which are each present in quantities of the order of 0.1 – 1.0%, render the mother liquor so viscous that good crystals are not obtainable and the crystallisation process takes a time of the order of several hours to complete. Moreover, the crystals are still far from the purity required for food grade acid, and several stages would be needed to produce such acid.

It is the object of the present invention to provide a process for the production of phosphoric acid crystals of food grade qualities from wet process phosphoric acid.

It is a further object of the invention to provide a process for improving the purity of wet process phosphoric acid which has previously had its impurity content reduced by solvent extraction.

Solvent extraction techniques for improving the purity of wet process phosphoric acid involve firstly the extracting at least part of the $P_2O_5$ values of the acid into an organic solvent separating this from the organic phase, optionally scrubbing the extract and then bringing about the release of the $H_3PO_4$ in an aqueous phase. Such a release may be accomplished normally by adding water. However, other release techniques such as raising the temperature may be employed if desired if a suitable solvent is used.

The present invention is based on our discovery that the acid obtained by the purification of WPA by solvent extraction, when concentrated to a concentration of at least 61% $P_2O_5$ and below 67% $P_2O_5$ and subsequently cooled, e.g. to below 20°C, produces in a single stage well-formed relatively large crystals of $H_3PO_4$ ½$H_2O$ which are of food grade purity, the crystallisation taking a period (or residence time in the case where a continuous crystallisation is employed) which can be as low as 2 hours.

Especially good results are obtained if the starting material is an acid containing less than 100 ppm of metal impurities such as is obtained by the latest methods of solvent extraction, for example those which are the subject of co-pending application Ser. Nos. 353,876 and 353,847 filed in the name of Thomas A. Williams of even date herewith, the subject matter of both of which is incorporated herein by reference. The first such process describes the extraction of WPA, i.e., wet process phosphoric acid having an acidity in the range of 65% to 85% (and preferably of 74% to 79%) by use of a haxanone (preferably methyl isobutyl ketone) preferably in two actual or theoretical counter current stages followed, preferably by scrubbing and subsequently by release into water, preferably by use of a counter current two stage contact with water. The second describes the extraction of WPA, i.e., wet process phosphoric acid having an acidity in the range of 40% to 70% (and preferrably of 50% to 70%) into a pentanone such as diethyl ketone or methyl n-propyl ketone, preferably employing two counter current stages, preferably followed by scrubbing and then release into water by contact with water in two or more counter current stages. One aspect of the present invention accordingly consists in the integration of such processes of solvent extraction with the present process of crystallisation. Where this is done, the mother liquor from the crystallisation may advantageously be used as the scrubbing liquor which may be employed to reduce the impurity content of the solvent extract. Other solvents such as tributyl phosphate butanol, amyl alcohol, isopropyl ether or other ethers may, however, be employed in the solvent extraction stage if desired.

Processes of such types are for example described in U.S. Pat. Nos. 1,838,431, 1,929,441 and 1,968,544 and British Patents Nos. 1162062, 1112033, 1093926 and 1093927 all of which are incorporated herein by reference.

Aqueous phosphoric acid may readily be concentrated to at least 61% $P_2O_5$, often to about 63% by conventional means such as vacuum evaporators, for example a forced circulation evaporator or by absorbing $P_2O_5$ into a solvent extracted purified acid.

Alternatively the solvent extracted acid may have its $P_2O_5$ content raised to the required level by dissolving $P_2O_5$ obtained by burning elemental phosphorus in air in it, for example by replacing water by solvent extracted wet process phosphoric acid in the hydrator unit or the scrubber unit of a conventional plant for the production of thermal phosphoric acid, such as is described at page 1211 of "Phosphorus and its Compounds" by J. R. Van Wager. A further way to raise the concentration of the solvent extracted acid is to mix it with super-phosphoric acid obtained by the thermal route.

The concentrated acid is cooled to bring about crystallisation. The period for which it is cooled or the residence time in a continuous crystaliser will depend upon the concentration of the acid and also the temperature to which it is cooled. We have found cooling to a temperature in the range 5°–15°C preferably 8°–12°C is normally satisfactory and that at such temperatures a residence time in the crystallisation vessel of about 2 hours will normally suffice.

Aqueous phosphoric acid of 66% $P_2O_5$ content and high purity may be obtained by melting the crystals formed or acid of a lower concentration may be obtained by dissolving the crystals in water.

If the acid used to produce the initial WPA from phosphate rock is sulphuric acid, the solvent-extracted acid contains a substantial proportion of sulphate ions, e.g. of the order of 0.5–1.0% $SO_3$ on a 62% $P_2O_5$ basis.

We have found that the presence of this impurity does not interfere with the crystallisation. If, however, an unduly large amount of sulphate adheres to the crystals when they are separated, e.g. by centrifuging, from the mother liquor, it can readily be removed by washing. Thus the invention obviates the need to de-sulphate the acid before solvent extraction by treatment with barium chloride, a substance which it is in any case inadvisable to use in the production of food grade acid.

The invention is illustrated by the following Example.

EXAMPLE 1

Solvent extracted wet process phosphoric acid was obtained by contacting in a continuous 2-stage counter current extractor at a temperature in the range 35°–40°C, 6.5 gal/h of feed acid with 18.0 gal/h of methyl isobutyl ketone and 5.2 gal/h of scrub liquor containing 56% $H_3PO_4$. This produces a raffinate of 3.0 gal/h contains 40.5% $P_2O_5$, 1.65% $SO_3$, 0.55% Fe, 0.6% Mg and 1.6% methyl isobutyl ketone. The organic phase containing 52% methyl isobutyl ketone, and 25.5% $P_2O_5$, and some impurities was then scrubbed in four counter current stages with 6.3 gal/h of purified acid to reduce the Fe content and the Mg content etc. This extract was then contacted with 3.6 gal/h water at 20°C. This produced an aqueous phase at a rate of 13.7 gal/h of specific gravity 1.40, and having a $P_2O_5$ content of 40.5% an $SO_3$ content of 0.65%, an Fe content of 25 ppm and a magnesium content of 5 ppm. Of this 6.3 gal/h are employed as scrubbing liquor and the remaining 7.4 gal/h collected. This is steam stripped counter currently in a packed column yielding 7.0 gal/h acid at SG = 1.43, containing 42.0% $P_2O_5$ and less than 50 ppm ketone, and recovering 0.2 gal/h each of ketone and water mutually saturated.

This essentially solvent free phosphoric acid is concentrated in a forced circulation evaporator at 80°C under reduced pressure to produce 4.0 gal/h containing.

62.0% $P_2O_5$
1.0% $SO_3$
40 ppm Fe
less than 10 ppm Mg
less than 50 ppm F
SG = 1.70/20°C which after cooling to 30°C is fed to a continuous crystalliser having a residence time of 2 hours operating at 8°–12°C. The slurry produced is centrifuged to produce 31.5 lb/hr of crystalline phosphoric acid hemihydrate ($2H_3PO_4H_2O$) of analysis 66% $P_2O_5$
less than 500 ppm $SO_3$
less than 5 ppm each of Fe, Mg, F and also 36 lb/hr of aqueous phosphoric acid of analysis 58% $P_2O_5$
1.9% $SO_3$
less than 100 ppm each of Fe, Mg, and F.

The purity of the crystalline product can be further improved by washing it with a solution of a portion of the crystals in water. This of course reduces the yield of crystals.

The crystals are melted by adding them to a stirred vessel in which the contents are maintained above 30°C to provide a liquid phosphoric acid suitable for transporting. The acid forming the mother liquor is suitable for sale as produced.

EXAMPLE 2

In this example the object was to recover the total "upgraded" phosphoric acid in the form of crystals. Phosphoric acid produced as in Example 1 from the solvent extraction operation, 14.7 gal/h, was steam stripped and concentrated to produce 8.0 gal/h containing 61.5% $P_2O_5$
1.55% $SO_3$
25 ppm Fe
10 ppm Mg
less than 50 ppm F
SG = 1.70/20°C which after cooling to 30°C was fed to a crystalliser comprising a stirred tank and a recirculaltion loop via a scraped surface heat exchanger, a temperature of approximately 10°C being maintained with brine circulating at −5°C. The residence time in the crystalliser was 2 hours.

The slurry produced was centrifuged yielding 64 lb/hr of phosphoric acid hemihydrate crystals and 72 lb/hr of aqueous phosphoric acid. 11 lb/hr of the crystals were dissolved in water to yield 12 lb/hr of aqueous phosphoric acid to be used for washing the crystals on the centrifuge.

The washings were combined with the separated aqueous phosphoric acid and diluted with 3.1 gal/h water to yield 8.1 gal/h acid to be used for scrubbing the solvent extract. This acid contained 41.0% $P_2O_5$ and 2.1% $SO_3$.

The resultant 53 lb/hr of crystals were melted in a stirred tank, the contents of which were maintained at 30°-40°C, to provide liquid phosphoric acid for sale containing 66% $P_2O_5$ less than 200 ppm $SO_3$ and less than 5 ppm each of Fe, Mg and F.

We claim:

1. In a process for purifying wet process phosphoric acid, which comprises mixing the acid with an organic solvent selected from the group consisting of acyclic pentanones, acyclic hexanones, tributyl phosphate, butanols, amyl alcohols, cyclohexanone and dialkyl ethers of two to four carbon atoms in each alkyl group, to produce an organic extract containing phosphoric acid, scrubbing the extract to reduce the impurity content of the extract, and treating the scrubbed extract to prepare a partially purified aqueous phosphoric acid having a metal impurity content of less than 100 ppm, the improvements comprising forming partially purified aqueous phosphoric acid solution having a $P_2O_5$ concentration of below 67% and at least 61%, and subsequently cooling to bring about the formation of crystals of $H_3PO_4 \cdot \frac{1}{2}H_2O$ and a mother liquor at a temperature below 20°C, and separating from the mother liquor, the crystals having a substantially reduced metal impurity content compared to that of the concentrated acid.

2. A process as claimed in claim 1 wherein said phosphoric acid solution has a $P_2O_5$ concentration of between 61% and 63%.

3. A process as claimed in claim 2 wherein the crystals of $H_3PO_4 \cdot \frac{1}{2}H_2O$ are washed with an aqueous solution of crystals of $H_3PO_4 \cdot \frac{1}{2}H_2O$.

4. A process as claimed in claim 3 wherein the crystals are melted to produce an aqueous food grade phosphoric acid having a $P_2O_5$ content of 66%.

5. A process as claimed in claim 2 wherein said phosphoric acid solution is cooled to a temperature in the range 5° to 15°C.

6. A process as claimed in claim 5 wherein said phosphoric acid solution is cooled to a temperature in the range 8° to 12°C.

7. A process as claimed in claim 2 wherein the concentration of the partially purified phosphoric acid is raised by a vacuum evaporation to form said phosphoric acid solution.

8. A process as claimed in claim 2 wherein the partially purified aqueous phosphoric acid is obtained by contacting wet process phosphoric acid of acidity 65-87% made from contact of sulphuric acid on phosphate rock with an acyclic hexanone to extract at least some of the $H_3PO_4$ values into the hexanone, scrubbing the hexanone extract and subsequently contacting the extract containing the $H_3PO_4$ with water to effect release of aqueous $H_3PO_4$.

9. A process as claimed in claim 8 wherein the hexanone is methyl isobutyl ketone.

10. A process as claimed in claim 9 wherein said phosphoric acid solution contains 0.5 - 1.55% $SO_3$.

11. A process as claimed in claim 10 wherein the extract of $H_3PO_4$ in the methyl isobutyl ketone is scrubbed with purified phsophoric acid prior to being contacted with water for the release.

12. A process as claimed in claim 11 wherein the extract of $H_3PO_4$ in methyl isobutyl ketone is scrubbed with purified phosphoric acid which is the mother liquor left after seperation of the crystals of $H_3PO_4 \cdot \frac{1}{2}H_2O$.

13. A process as claimed in claim 12 wherein the crystals of $H_3PO_4 \cdot \frac{1}{2}H_2O$ from the crystallization are washed with an aqueous solution of crystals of $H_3PO_4 \cdot \frac{1}{2}H_2O$.

14. A process as claimed in claim 8 which comprises:
a. contacting wet process phosphoric acid of acidity 65-85% obtained by contact of sulphuric acid on phosphate rock with methyl isobutyl ketone to form an organic phase containing $H_3PO_4$ and an aqueous raffinate,
b. separating the organic phase from said aqueous raffinate,
c. scrubbing the organic extract,
d. contacting the scrubbed organic extract with water in at least two counter current stages to effect the release of aqueous $H_3PO_4$ to produce an aqueous acid phase and an organic phase,
e. separating the aqueous and organic phases,
f. raising the concentration of the aqueous phase to form a phosphoric acid solution of at least 61% $P_2O_5$ concentration,
g. cooling said phosphoric acid solution to below 20°C to bring about the crystallization of crystals of $H_3PO_4 \cdot \frac{1}{2}H_2O$ from the mother liquid,
h. separating said $H_3PO_4 \cdot \frac{1}{2}H_2O$ crystals from said mother liquor, which is recycled for use as the scrub liquor for scrubbing the organic extract in stage (c), said $H_3PO_4 \cdot \frac{1}{2}H_2O$ crystals having a substantially reduced metal impurity content compared to that of the concentrated acid.

15. A process as claimed in claim 14 wherein said phosphoric acid solution in step (f) contains 0.5 - 1.55% $SO_3$.

16. A process as claimed in claim 14 wherein the wet process acid in step (a) has an acidity of 74 - 79%.

17. A process as claimed in claim 16 wherein the crystals from step (h) are washed with an aqueous solution of $H_3PO_4 \cdot \frac{1}{2}H_2O$ crystals.

18. A process as claimed in claim 14 wherein the concentration of the partially purified phosphoric acid in step (f) is raised by vacuum evaporation.

19. A process as claimed in claim 2 which comprises:
a. contacting wet process phosphoric acid of acidity 50-70% obtained by contact of sulphuric acid on phosphate rock with an acyclic pentanone to form an organic phase containing at least some of the $H_3PO_4$ content and an aqueous raffinate,
b. separating said organic phase and said aqueous raffinate,
c. scrubbing the organic extract,
d. contacting the scrubbed organic extract with water in at least two counter current stages to effect the release of aqueous $H_3PO_4$ to produce an aqueous acid phase and an organic phase,
e. separating the aqueous and organic phases,
f. raising the concentration of the aqueous acid phase to form a phosphoric acid solution of at least 61% $P_2O_5$ concentration,
g. cooling said phosphoric acid solution to below 20°C to bring about the crystallization of crystals of $H_3PO_4 \cdot \frac{1}{2}H_2O$ from the mother liquor, and
h. separating said crystals from said mother liquor to leave crystals having a substantially reduced metal impurity content compared to that of the concentrated acid.

20. A process as claimed in claim 19 wherein the mother liquor separated in stage (h) is recycled to stage (c) for use as the agent for scrubbing the organic extract.

21. A process as claimed in claim 19 wherein said phosphoric acid solution in step (f) contains 0.5 – 1.55% $SO_3$.

22. A process as claimed in claim 20 wherein the crystals from step (h) are washed with an aqueous solution of $H_3PO_4 \cdot \frac{1}{2}H_2O$ crystals.

23. A process as claimed in claim 19 wherein the concentration of the partially purified phosphoric acid is raised by vacuum evaporation to form said phosphoric acid solution.

24. A process as claimed in claim 1 wherein the partially purified phosphoric acid obtained from the solvent extract is contacted with phosphorus pentoxide to raise its $P_2O_5$ content to at least 61% to form said phosphoric acid solution.

25. A process as claimed in claim 14 wherein step (f) is effected by contacting the aqueous phase with a phosphorus containing composition selected from the group consisting of phosphorus pentoxide and thermal phosphoric acid.

26. A process as claimed in claim 19 wherein step (f) is effected by contacting the aqueous phase with a phosphorus containing composition selected from the group consisting of phosphorus pentoxide and thermal phosphoric acid.

* * * * *